Sept. 27, 1960 E. O. STONE 2,954,503

TRANSISTORIZED DEFLECTION CIRCUIT

Filed Jan. 28, 1960

INVENTOR.
Elmer O. Stone
BY
Michael Hertz,
ATTORNEY 2,954,503

TRANSISTORIZED DEFLECTION CIRCUIT

Elmer O. Stone, Seneca Falls, N.Y., assignor to Sylvania Electric Products Inc., a corporation of Delaware Filed Jan. 28, 1960, Ser. No. 5,148
4 Claims. (Cl. 315—27)

The present invention relates to a transistorized cathode ray deflection circuit.

It is an object of the invention to provide a simple circuit involving a transistor to accomplish proper electromagnetic deflection of the cathode ray and with a conventional type of picture tube.

For a full understanding of the invention attention is directed to the following specification when taken in conjunction with the accompanying drawings in which.

Figure 1:
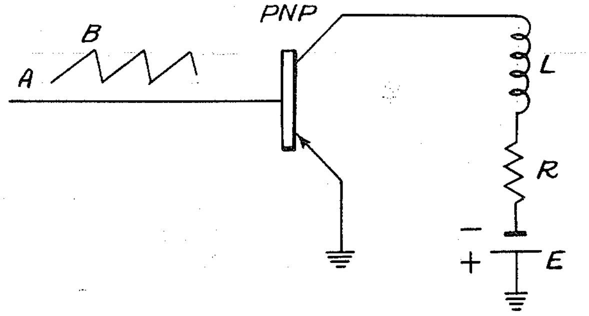
FIG. 1. PRIOR ART
Fig. 1 is a theoretical cathode ray deflecting circuit utilizing a transistor and a deflecting coil.

The simplest form of circuitry involving a transistor and deflection coils with outside pulse triggering is illustrated in Fig. 1. In this figure for purposes of illustration, the transistor is selected as of the PNP type with common emitter. If a saw tooth voltage be applied to the base of the transistor, a saw tooth current will flow in the emitter-collector circuit of the transistor. The deflecting coil L with its inherent resistance R and the battery E are in that circuit. At the beginning of the sweep, represented by point A on the saw tooth driving voltage, the transistor is biased to minimum or zero current. As the driving voltage increases to the maximum point B, the emitter-collector current, and therefore the current flowing through the deflecting coil L, increases to its maximum peak value. Then during the retrace, the current decreases from maximum to minimum or zero again. The tracking of the pulse in the winding L is particularly true where the vertical deflecting coils of a television circuit are concerned since at the low 60 cycle vertical scanning frequency the coils are essentially resistive rather than inductive.

The undesirability of using the simple circuit of Fig. 1 arises from the fact that when the coil current is zero, which is at the beginning of a trace, the spot, with a conventional gun, is located at the center of the tube screen. When the saw tooth voltage is applied, the ray is deflected from the center of the tube screen toward and beyond the lower edge of the tube screen, a considerable amount of direct current then flowing through the emitter-collector circuit including the coil L. Thus only one half of a picture would be developed on the face of the tube, the upper half of the screen in the case of vertical deflection, being blank.

This problem has been recognized and various solutions have been suggested in the past. One solution is to place magnets about the picture face to bias the beam from its center position. This is expensive and generally results in distortion of the picture. Another method is to interpose a transformer between the transistor and the deflecting coil so that the direct current component flowing through the transistor would not flow through the coil and only the alternating current component of the pulse would be transmitted to the coil. The use of a transformer is objectionable from the standpoint of weight and cost since a large amount of iron is required to provide the necessary inductance at the low vertical sweep frequency.

With the disclosed invention, the magnets and transformer need not be used and yet the picture will remain centered. How this may be accomplished will be understood by referring to Fig. 2. In said figure, for purposes of illustration, the deflection coils are referred to as the vertical deflection coils, although it should be understood the invention is applicable to other low frequency deflection circuits, or when the deflecting yoke winding is essentially resistive, rather than inductive.

Figure 2:
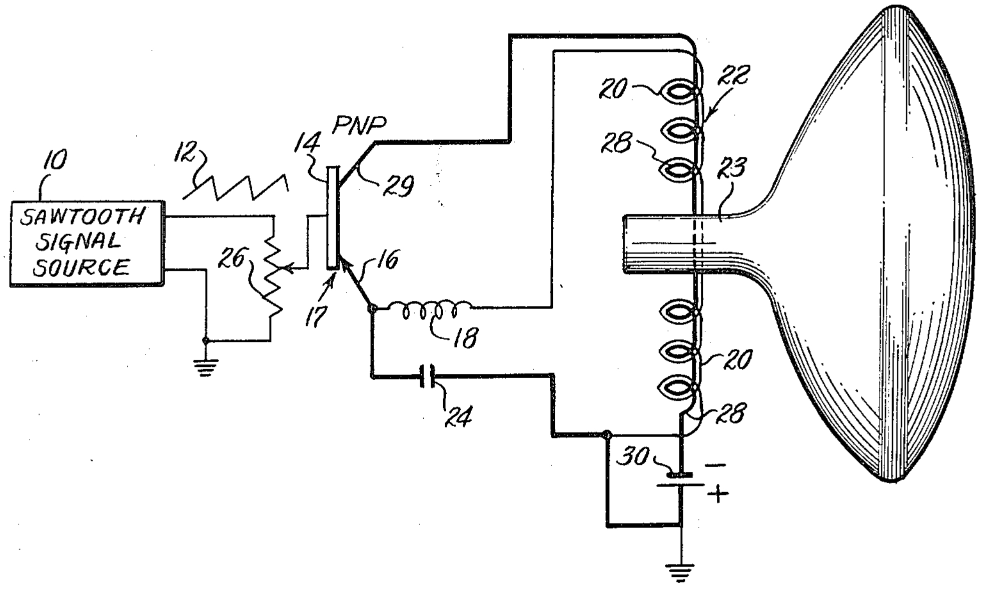
Fig. 2 is a schematic diagram showing a transistor deflection circuit in accordance with the invention.

In said Fig. 2 there is shown at 10 a source of saw tooth voltage of the shape indicated at 12, which voltage is applied across the base 14 and emitter 16 of the transistor 17, here depicted as of the PNP type, although obviously, with battery voltage reversed, it may be of the NPN type. The emitter 16 of the transistor is connected via a low resistance high Q inductor 18 to one end of a spot deflector biasing coil 20 of a bifilar winding 22 situated about the neck of the tube 23. Shunting the coil 20 and inductor 18 is a large capacitor 24. The opposite end of the coil and one end of the capacitor 24 are grounded. Also if desired, a potentiometer 26 may be employed to control the magnitude of the input pulse to the transistor. The saw tooth pulse passes through the emitter and the capacitor 24, to ground and back to the pulse source.

The bifilar winding also comprises a second coil 28, one end of which is connected to the collector 29 of the transistor and the other end to a direct current potential source such as battery 30, the opposite end of the battery being grounded. With no pulse applied to the transistor, a direct current flows from the positive end of battery 30, through coil 20, low resistive inductor 18, emitter 16, collector 29, coil 28 and back to the negative end of battery 30. This current is of a magnitude equal to the average value of the saw tooth current flowing through the coil 28.

The operation of the circuit illustrated in Fig. 2 will now be explained. The battery 30 will supply like direct current through the transistor to both series connected coils 28 and 20. The directions and connections of the windings of the coils are such that there will be no resulting spot deflection due to the battery current, the current flowing from the battery through the coil 20, inductor 18, emitter 16, collector 29 and coil 28 back to the battery. When a pulse is applied across the base and emitter via the pulse source 10, ground, capacitor 24, emitter 16, base 14 and back again to source 10, a current pulse flows in the emitter collector circuit via deflecting coil 28, but is blocked out from coil 20 by the inductor 18. If a pulse had been applied to the transistor and the capacitor 24 were absent, because of the double coils 20, 28 and their polarities, the spot on the tube would not have been deflected since practically the same current would have flown through both coils, but in opposite directions. The bifilar character of the winding assists in the neutralization of the effects of the current flow through the coils. But with the presence of capacitor 24, and more particularly because of the presence of the inductor 18, the pulse current is unequal through the coils and spot deflection does take place. Thus almost the entire alternating current component is effective to deflect the spot. At the same time, the ray deflection effects the direct current component around the collector emitter circuit might have had, is neutralized by the interaction of coils 20 and 28. Thus the saw tooth voltage may be applied to cause deflection of the ray over the entire face of the tube. The inductor 18 is provided to prevent the circuit section including yoke coil 20 from loading that section including the coil 28, whereby although the coils 20 and 26 will neutralize the magnetic field under direct current, there will be spot deflection when a pulse is applied to coil 28.

What is claimed as new is:

1. A deflection circuit for a cathode ray tube comprising a transistor including a base, an emitter and a collector, a source of direct current voltage having one end grounded, a deflecting coil connected at one end with the other end of said direct current source, a second coil adjacent the deflecting coil, means connecting the second coil at one end with said emitter and at the other end with the grounded end of said direct current source, a by-pass capacitor around said second coil, and means connected between the base of the transistor and ground for pulsing said transistor, said coils being wound in directions to neutralize the effects of any direct current flowing serially through them.

2. A deflection circuit for a cathode ray tube comprising a transistor including a base, an emitter and a collector, a source of direct current voltage having one end grounded, a deflecting coil connected at one end with the other end of said direct current source, a second coil adjacent the deflecting coil, means connecting the second coil at one end with said emitter and at the other end with the grounded end of said direct current source, a by-pass capacitor around said second coil, and means connected between the base of the transistor and ground for pulsing said transistor, said coils being bifilar and wound in directions to neutralize the effects of any direct current flowing serially through them.

3. A deflection circuit for a cathode ray tube comprising a transistor including a base, an emitter and a collector, a source of direct current voltage having one end grounded, a deflecting coil connected at one end with said collector and at the other end with the other end of said direct current source, a second coil adjacent the deflecting coil, an inductor and a capacitor, means connecting the second coil at one end via the inductor with said emitter and at the other end with the grounded end of said direct current source and one end of said capacitor, means connecting the other end of said capacitor with the emitter, and means connected between the base of the transistor and ground for pulsing said transistor, said coils being wound in directions to neutralize the effects of any direct current flowing serially through them.

4. A deflection circuit for a cathode ray tube comprising a transistor including a base, an emitter and a collector, a source of direct current voltage having one end grounded, a deflecting coil connected at one end with the other end of said direct current source, a second coil adjacent the deflecting coil, an inductor and a capacitor, means connecting the second coil at one end via the inductor with said emitter and at the other end with the grounded end of said direct current source and one end of said capacitor, means connecting the other end of said capacitor with said emitter, and means connected between the base of the transistor and ground for pulsing said transistor, said coils being bifilar wound and in directions to neutralize the effects of any direct current flowing serially through them.

References Cited in the file of this patent

UNITED STATES PATENTS 2,924,744 Paynter ---------------- Feb. 9, 1960